(12) United States Patent
Huang et al.

(10) Patent No.: US 7,372,870 B2
(45) Date of Patent: May 13, 2008

(54) ETHERNET TRANSMISSION APPARATUS WITH A QUICK PROTECTIVE AND FAIR ATTRIBUTE AND ITS METHOD

(75) Inventors: Feng Huang, Shanghai (CN); Ming Cheng, Shanghai (CN)

(73) Assignee: ALCATEl, Paris (FR)

( * ) Notice: Subject to any disclaimer, the term of this patent is extended or adjusted under 35 U.S.C. 154(b) by 707 days.

(21) Appl. No.: 11/002,285

(22) Filed: Dec. 3, 2004

(65) Prior Publication Data
US 2005/0141417 A1    Jun. 30, 2005

(30) Foreign Application Priority Data
Dec. 26, 2003   (CN)   .................... 2003 1 0122842

(51) Int. Cl.
H04J 3/16       (2006.01)
H04J 3/22       (2006.01)
G01R 31/08      (2006.01)
G06F 11/00      (2006.01)
H04L 1/00       (2006.01)
H04L 12/28      (2006.01)
H04L 12/56      (2006.01)

(52) U.S. Cl. .................... 370/466; 370/227; 370/235; 370/401

(58) Field of Classification Search ............... 370/216, 370/225, 227–228, 235, 401, 466
See application file for complete search history.

(56) References Cited

U.S. PATENT DOCUMENTS 6,647,428 B1   11/2003   Lindquist et al.

2004/0105459 A1*   6/2004   Mannam ................. 370/465
2004/0156313 A1*   8/2004   Hofmeister et al. ..... 370/229

FOREIGN PATENT DOCUMENTS

WO   WO 2004/066120 A   8/2004

OTHER PUBLICATIONS

Vivace Networks: "Delivering Ethernet Traffic in MAN/WAN," White Paper, Online!Dec. 31, 2002, XP002314622.
Itu-T "Y.1720 Protection switching for MPLS networks." Series Y, Global Information Infrastructure, Internet Protocol Aspects and Next Generation Networks, Online! Sep. 2003, XP002314623.

* cited by examiner

Primary Examiner—Kevin C. Harper
(74) Attorney, Agent, or Firm—Sughrue Mion, PLLC

(57) ABSTRACT

An Ethernet transmission apparatus having a quick protection and fair attribute as well as a corresponding method are disclosed. The apparatus comprises a sorter, MPLS processing module and a SDH processing module, wherein, the MPLS processing module includes a VC tag packaging unit, a multiplexing unit, a tag managing unit, a scheduler, an MPLS protective unit, an MPLS signaling unit and a Fair algorithm unit. The present invention sorts the Ethernet transactions and labels VC tags by the VC tag packaging unit so as to form a PW LSP. PW LSP with a plurality of identical source and target ends are multiplexed into a tunnel LSP. MPLS signaling unit counts the network nodes that LSP passes by and calculates a protective LSP. MPLS protective unit selects an active LSP or a protective LSP and enters the scheduler for queuing. The FAIR algorithm controls the allotment of the bandwidth so as to secure the fairness of the transactions.

8 Claims, 4 Drawing Sheets

ETHERNET TRANSMISSION APPARATUS WITH A QUICK PROTECTIVE AND FAIR ATTRIBUTE AND ITS METHOD

TECHNICAL FIELD

The present invention relates to a MPLS (Multiple Protocol Label Switching) technique and a SDH (Synchronous Digital Hierarchy) network technology. In particular, the present invention provides an Ethernet transmission apparatus with a quick protective and fair attribute and its method on the basis of incorporating SDH transmission technology and Martini MPLS technology.

PRIOR ART BACKGROUND

MPLS (Multiple Protocol Label Switching) technology was proposed in 1997 by IETF (Internet Engineering Task Force). MPLS adopts tags to package the data in upper layers. The MPLS label is added/moved by routers at the edge of a network, it imitates the quick and simple switches in the centre of the network and to perform one-routing-multiple switching for one connecting request and thus improve the network performance. MPLS adopts a simplest technology to perform the transfer from a third layer to a second layer. The MPLS technology has become a predominant technology for the core network.

Ethernet transaction has become a major task of the operators and it has become a tendency to transmit Ethernet transactions in a MPLS network. IETF (Internet Engineering Task Force) PWE3 (edge-to-edge pseudo wires) faculty is drafting a specification which specifies the Ethernet transaction being encapsulated through Martini MPLS with VC (virtual Circuit) label is added to form a PW LSP (pseudo wire label switching path), with multiple PW LSP having identical source and destination ends multiplexed to one tunnel LSP through added tunnel labels, and transmitted in package-switching network.

In PWE3 technology, the setup of LSP may be performed through a RSVP-TE (resource reservation and reserved engineering protocol) signaling (cf. RFC3209 in IETF). The protection of LSP may be performed through adopting LSP linear protection (1:1 or 1+1) and fast reroutes (cf. ITU-T (International Telecommunication Union-Telecommunications) proposal Y.1720).

Typically, an Ethernet adopts a do-its-best principle. When the network is congested, the packet is discarded and thus the transmission of a bandwidth can not be assured. To ensure the transmission of the bandwidth, it is required that the Ethernet have a fair attribute. The fair attribute of an Ethernet transaction refers to such a situation that, when the network is congested while in transmission, different transaction will be assured to have a different bandwidth. Typically the fairness can be embodied by RPR (Resilient Package Ring) (cf. IEEE802.17).

PWE 3 scheme has not included a solution to the fairness for Ethernet transactions, especially when transaction protection occurs. Extra transactions in the protective channel are discarded and thus the fairness in the transaction on the protective LSP can not be ensured.

With the development of the SDH (synchronous digital hierarchy) network, operator's cost in network will be significantly reduced if data traffics can be high-effectively and flexibly transmitted on MPLS.

It will be difficult to provide a solution within the aforesaid technical frame.

SUMMARY OF THE INVENTION

The object of the invention is to provide an Ethernet transmission apparatus having a quick protective and fair attribute and its method.

The present invention provides an Ethernet transmission apparatus having a quick protective and fair attribute, including a sorter for analyzing Ethernet frame heads and the Ethernet incoming rates for the incoming Ethernet transactions and then sorting the Ethernet transactions to output QoS Ethernet transactions; and a MPLS processing module, including sequentially connected VC-tag packaging unit, multiplexing unit, tag managing unit and a scheduler, wherein, the VC-tag packaging unit is connected with said sorter for packaging the Ethernet transactions of different QoS and labeling different tags to the Ethernet transactions of different QoS to form PW; the multiplexing unit multiplexing the PWs of identical starting points and destination in a way of a tag stack through adding outer MPLS tunnel tags, and forming tunnel LSP after the multiplexing; the tag managing unit including a repeater and a tag exchanging table, the repeater repeats the tags according to the information in the tag exchanging table which is used for identifying two labeled exchanging paths, i.e. an active LSP and a protective LSP; a scheduler schedules the incoming data to ensure the QoS of the transaction, characterized in that, first, said MPLS processing module further includes sequentially connected MPLS protecting unit, MPLS signaling unit and a fairness algorithm unit, wherein the MPLS signaling unit being used to set up the tag exchanging table identifying the active LSP and the protective LSP and controlling the operation of the repeater, extending RSVP-TE signaling, forwarding fairness message and protective message; MPLS protecting unit being used to update the tag exchanging table when the active LSP being in error and to adopt a switching-over action to switch-over into the protective LSP; the fairness algorithm unit being used to operate the fairness algorithm to indicate the allotted bandwidth of the scheduler; second, said Ethernet transmission apparatus having a quick protective and fair attribute further includes an SDH processing module connected with said scheduler, said SDH processing module including a GFP packaging unit and a SDH VC crossing and payload processing unit, wherein the GFP packaging unit being used for packaging one or more data transactions with doubled layered MPLS tags into the SDH VC through the GFP packaging unit; the SDH VC crossing and payload processing unit being used to exchange the SDH VC for forming a STM-N signal after the regenerating field and the multiplexing field processing, said sorter, MPLS processing module and the SDH processing module are respectively connected to a network managing system.

Said Ethernet transmission apparatus having a quick protective and fair attribute, wherein, the scheduling way that the scheduler adopts is FIFO or weighed fairness scheduling or weighed pre-congestion detection.

Said Ethernet transmission apparatus having a quick protective and fair attribute wherein, said MPLS signaling unit extends the Path and Resv messages in RSVP-TE signaling through defining three novel objects: FAIR, FDI and BDI objects.

Said Ethernet transmission apparatus having a quick protective and fair attribute, wherein, said fairness algorithm unit executes the fairness algorithm to calculate the RATE field value in the FAIR object to indicate the bandwidth allotted to the Ethernet transaction by the scheduler.

Said Ethernet transmission apparatus having a quick protective and fair attribute, wherein said GFP packaging module applies a new definition to the UPI field in the GFP frame for directly packaging the MPLS frame into SDH VC.

An Ethernet transmission method having a quick protective and fair attribute including steps of: 1) analyzing by a system the package head of the Ethernet transaction for the incoming Ethernet transaction for determining the incoming rate of the Ethernet transaction; 2) labeling a VC-tag of a first class if the incoming rate>a first set bandwidth value; or otherwise whether the incoming rate>a second set bandwidth value is further determined, if true, a VC-tag of second class is labeled, or otherwise the incoming rate>a third set bandwidth value is further determined, if true, a VC-tag of third class is labeled; in such a iterative way the greatness between the incoming rate and the n-th set bandwidth value is determined up to a VC-tag of n-th class is labeled to the incoming rate and thus Ethernet transactions with N different bandwidths are obtained, wherein, N is a natural number; 3) transactions with N different bandwidths are transacted for identical target address and identical source address and labeled with outer MPLS tunnel tags, and multiplexed through way of tag stacks to form a tunnel LSP after the multiplexing; and 4) the system enables a signaling protocol to set-up a tag exchange table identifying the active LSP and protective LSP to determined whether a receipt contains an FDI message or a BDI message; if true, the tag exchange table is updated and the protective LSP is selected; or otherwise, the tag is transferred; 5) calculating the RATE field value in the FAIR object of the Resv message according to the fairness algorithm, producing a fairness message and allotting bandwidths to the transferred transactions; 6) packaging one or more data transactions with double layered MPLS tags into SDH VC through the GFP packaging unit, and exchanging the SDH VC and forming a STM-N signal after the processing of the regenerated field payload and multiplexed field payload.

Said Ethernet transmission method having a quick protective and fair attribute, wherein, the active LSP and protective LSP in step 4) independently transmit data, when a protection occurs, the transaction in the active channel is switched-over to the protective channel, the nodes on the protective LSPs are controlled by the fairness algorithm and bandwidths are re-allotted.

Said Ethernet transmission method having a quick protective and fair attribute, wherein, the procedure for said fairness algorithm unit that undertakes the RAKE calculation for the nodes that active LSP passes by is: setting bi to represent the bandwidth a node accesses, Wi to represent a fairness factor allotted to the node, B to represent the entire bandwidth, R to represent a reserved bandwidth; when the system initialized, assigning RATE=(B−R)/(W1+W2+ ... +Wn); for ith node, determining bi/Wi<RATE and b1+b2+ ... +bi<B−R; if false, adjusting RATE; if true, outputting RATE, when RATE being derived, the bandwidth for each accessing node is RATE×Wi; when protection occurs, the calculation procedure for RATE' of the nodes that a protective LSP passes by is: setting bi' to represent the bandwidth a node accesses, Wi' to represent a Fairness factor allotted to the node, B' to represent the entire bandwidth, R' to represent a reserved bandwidth; when the system initialized, assigning RATE'=(B'−R')/(W1'+W2'+ ... +Wn'); for i'th node, determining bi'/Wi'<RATE' and b1+b1'b2'+ ... +bi'<B'−R'; if false, adjusting RATE'; if true, outputting RATE', when RATE' is derived, the bandwidth for each accessing node is RATE'×Wi'.

When the aforesaid technical solution is adopted, i.e. the package head of the Ethernet is analyzed by the sorter to sort the Ethernet transactions, VC-tags are labeled by a VC-tag packaging unit to form PW LSP, a plurality of PW LSP with identical source and destination ends are multiplexed into a tunnel LSP, network nodes that LSP passes by are counted by a MPLS signaling unit and a protective LSP is calculated at same time, so that an active LSP or a protective LSP is selected by a MPLS protecting unit, the scheduler performs scheduling, and the allotment of bandwidth is controlled by the fairness algorithm to ensure the fairness of the transaction.

BRIEF DESCRIPTION OF THE DRAWINGS

FIG. 4b is a fairness algorithm for each node that active LSP passes by;

FIG. 4a' is a schematic diagram for incoming rate of active(work) LSP and protect LSP when in switching-over;

FIG. 4b' is a fairness algorithm for each node that the protect LSP passes by;

DETAILED DESCRIPTION OF THE PREFERRED EMBODIMENTS

Figure 1:
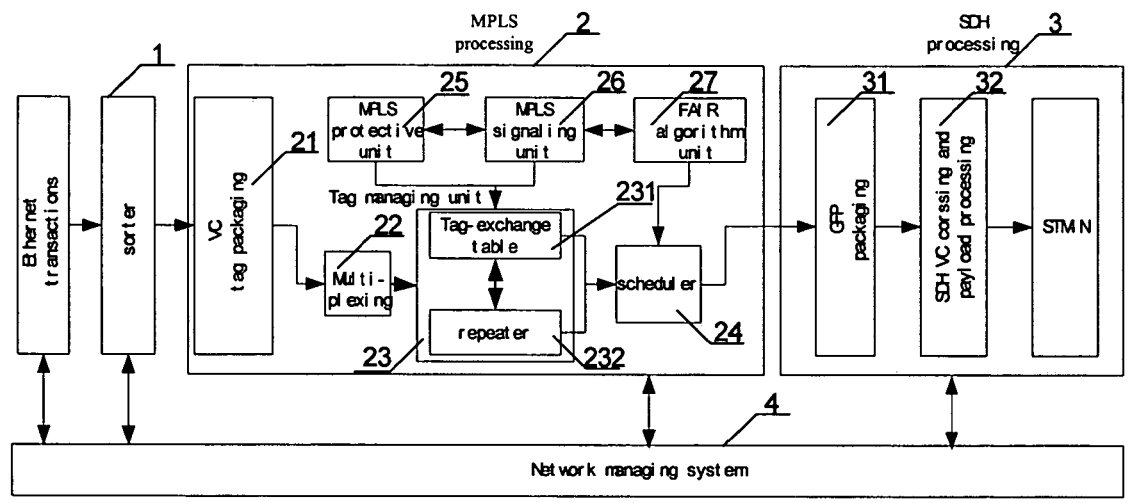
FIG. 1 shows a structural block diagram of an Ethernet transmission apparatus having a quick protection and fairness attribute.

As shown in FIG. 1, the Ethernet transmission apparatus having a quick protective and fair attribute of the present invention comprises sequentially connected sorter 1, MPLS processing module 2 and SDH processing module 3 that are respectively connected to a network managing system 4. Following is a detailed description.

I. Sorter 1, used for analyzing the TOS of the Ethernet frame head. The Ethernet transactions are classified into three categories: Ethernet transaction of an output QoS, i.e. Assured service, regulated service and best effort service.

II. MPLS processing module 2, including sequentially connected VC tag-packaging unit 21, multiplexing unit 22, tag managing unit 23 and scheduler 24, as well as sequentially connected MPLS protecting unit 25, MPLS signaling unit 26 and fairness algorithm unit 27, wherein tag-exchanging table 23 is respectively connected to MPLS protecting unit 25 and MPLS signaling unit 26, and fairness algorithm unit 27 is connected to scheduler 24.

VC-tag packaging unit 21 enables the packaging of the Ethernet transaction of different bandwidths and labeling different VC (virtual circuit) tag for Ethernet transactions of different bandwidths so as to form PW(pseudo wires).

Based on the specification of IETF PWE3 draft-ietf-pwe3-ethernet-encap-02.txt, the preceding and FCS field of the Ethernet transaction are removed and VC-tag of 32 bits is labeled so as to form PW(pseudo wires) LSP.

Multiplexing unit 22 enables the multiplex of PW. According to the specification of IETF RFC3032, PWs with identical starting points and destination are multiplexed by way of tag-stacks through labeling outer MPLS tunnel tags and afterwards tunnel LSP (label switching path) is formed.

Tag managing unit 23 includes repeater 232 and tag-exchanging table 231. Tag-exchanging table 231 identifies two label-switching paths, i.e. active LSP and protective LSP. Repeater 232 repeats the transaction according to the tag-exchanging table 231.

Scheduler 24 enables the queuing of the incoming data and securing the bandwidths of the clients. The adopted queuing way is either FIFO (first-in first-out) or WFQ (weighed fairness queuing) or WRED (weighed Random Early Detection).

MPLS signaling unit 26 enables the control of the set-up of both the active LSP, which is identified by the tag-exchanging table 231 of the nodes, and the protecting LSP, which is used to forward the fairness message and the protecting message.

Figure 2:
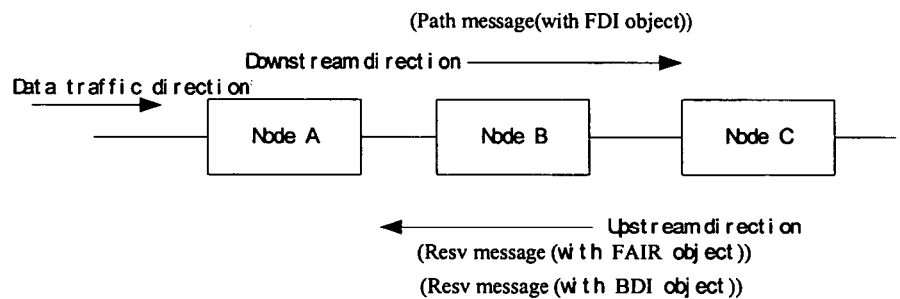
FIG. 2 schematically shows the message transmission direction.

As shown in FIG. 2, data and Path message with FDI (forward direction indication) starts from LSP (node A transferred to node C), Resv message with both FAIR object and BDI (backward direction indication)(node C transferred to node A) to execute RSVP-TE signaling extension through defining FDI, BDI and FAIR objects and defining novel ClassNum, C-Type.

The extension of Path and Resv messages:

Extending the Path message:

```
<Path Message>::=<Common Header>[INTEGRITY>]
        <SESSION><RSVP_HOP>
        <TIME_VALUES>
        [<EXPLICIT_ROUTE>]
        <LABEL_REQUEST>
        [<SESSION_ATTRIBUTE>]
        [<POLICY_DATA>...]
        <sender descriptor>
<sender descriptor>::=<SENDER_TEMPLATE><SENDER_TSPEC>
        [<ADSPEC>]
        [<RECORD_ROUTE>]
        [<FDI>]
```

Extending the Resv message:

```
<Resv Message>::=<Common Header>[INTEGRITY>]
        <SESSION><RSVP_HOP>
        <TIME_VALUES>
        [<RESV_COFIRM>][<SCOPE>]
        [<POLICY_DATA>...]
        <STYLE><flow description list>
<flow descriptor list>::=<FF flow descriptor list>
                      |<SE flow descriptor>
<FF flow descriptor list>::=<FLOWSPEC><FILTER_SPEC>
                      |<LABEL>[<RECORD_ROUTE>]
                      |<FF flow descriptor list>
                      <FF flow descriptor>
<FF flow descriptor>::=[<FLOWSPEC>]<FILTER_SPEC><LABEL>
                      [<RECORD_ROUTE>][<BDI>]
<SE flow descriptor>::=<FLOWSPEC><SE filter spec list>
<SE filter spec list>::=<SE filter spec>
                      |<SE filter spec list><SE filter spec>
<SE filter spec> ::=<FILTER_SPEC><LABEL>
                      [<RECORD_ROUTE>][<FAIR>]
```

Three new objects are:

FDI object (indicating the protective switch-over of the receiving end)

BDI object (indicating the protective switch-over of the transmitting end)

FAIR object (indicating the fairness attribute of the transmitting nodes)

Their definitions respectively are:

FDI object
ClassNum = 231, C-type = 1

| 0 | 1 | 2 | 3 |
|---|---|---|---|
| Length | | Class-Num | C-Type |
| IP address | | | |
| PT (3 bits) | Reserved | | |

| PT | Protection and Priority |
|---|---|
| 000 | Clearance |
| 001 | locked Protection (LoP) |
| 010 | Forced Switching-over |
| 011 | Signaling Failed |
| 100 | Manual Switching-over |
| 101 | Waiting for Restoration |
| 110 | No-requesting |
| 111 | Reservation |

BDI Objects
ClassNum = 231, C-type = 2

| 0 | 1 | 2 | 3 |
|---|---|---|---|
| Length | | Class-Num | C-Type |
| IP address | | | |
| SW (1 bit) | Reserved | | |

SW = 0 Originating End Reserved
SW = 1 Originating End Switched-over
FAIR Objects ClassNum = 231, C-type = 3

| 0 | 1 | 2 | 3 |
|---|---|---|---|
| Length | | Class-Num | C-Type |
| IP address | | | |
| FCM (3 bits) | RATE (16 bits) | Reserved | |

FCM: 000-No Congested
    001-singnle-point congested
    010-Multi-point congested RATE: representing the maximum bandwidth of the allowed points accessed, 0 represents FULL RATE, bandwidth can be fully covered.

MPLS protecting unit 25 is used to switching-over a transaction into the protecting LSP through switching-over action when the active LSP is in error.

Figure 3A:
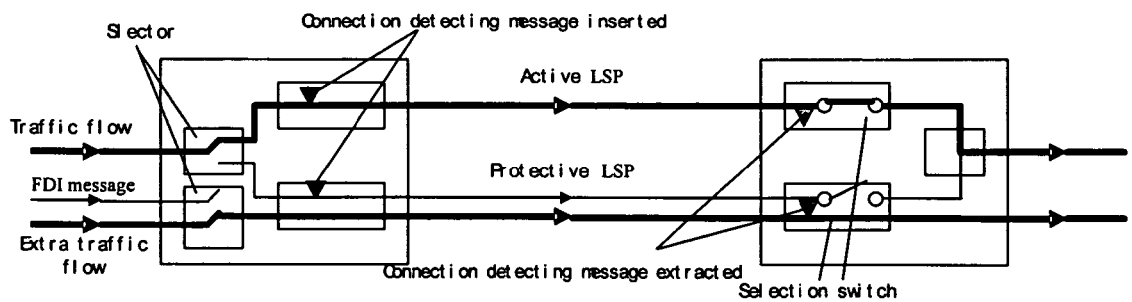
FIG. 3a schematically shows the active LSP and the protect LSP.
Figure 3B:
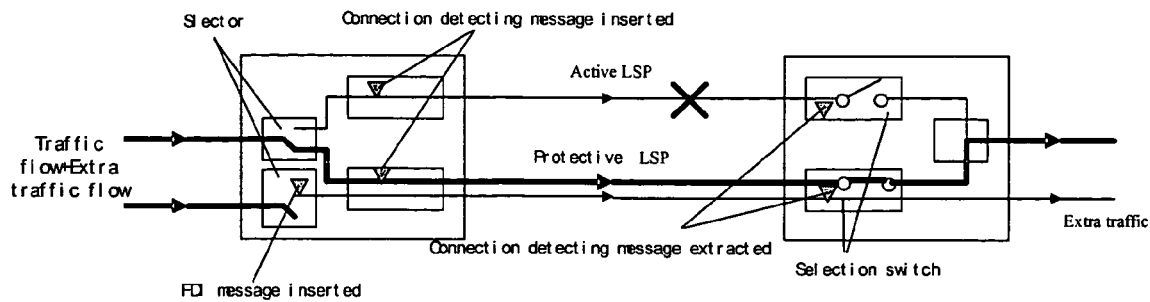
FIG. 3b schematically shows the protect switch-over.

The protective switching-over procedure is:

Active LSP and protecting LSP each independently transmits data;

Fairness mechanism is enabled on active LSP and protective LSP;

Receiving end receives Path Message with FDI (Forward Defect Indication) object as shown in FIG. 3a or detects errors in active LSP as shown in FIG. 3b;

Bridge selector at the receiving end is switch-over to the protective LSP;

Transmitting the Resv Message with BDI (Backward Defect Indication) object to the transmitting nodes;

Transmitting nodes switch the active LSP to the protecting LSP;

Protecting channels redistribute bandwidths to transactions by means of the fairness mechanism.

Fairness algorithm unit 27 is adopted to control the scheduler, operate the fairness algorithm to calculate the RATE field values in the Resv message and instruct the scheduler to allot the bandwidths;

The fairness algorithm counts the RATE field values in the Resv message and instruct the scheduler to allot the bandwidths.

Resv (FAIR) message determines whether the network is congested when in transmission, if not, FCM is set to 000, and RATE field is set to 000. When congestion occurs, FCM and RATE fields of the FAIR object are set.

The calculation on the RATE field in FAIR object

Figure 4A:
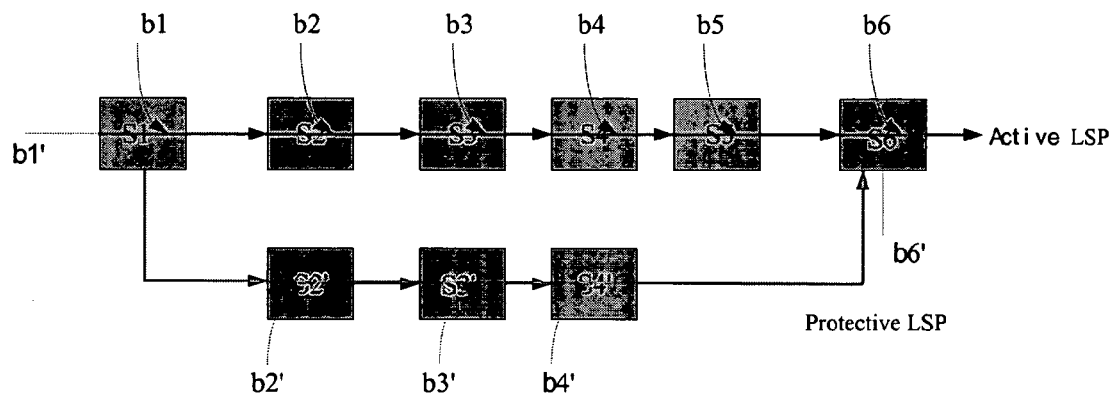
FIG. 4a is a schematic diagram for incoming rate of active LSP and protect LSP when in operation.

FIG. 4a shows the nodes that active LSP passes by, in the allotted bandwidth, bi represents the bandwidth that this node accesses. Wi represents the Fairness factor allotted to this node; B represents the total bandwidth; and R represents the reserved bandwidth.

Figure 4B:
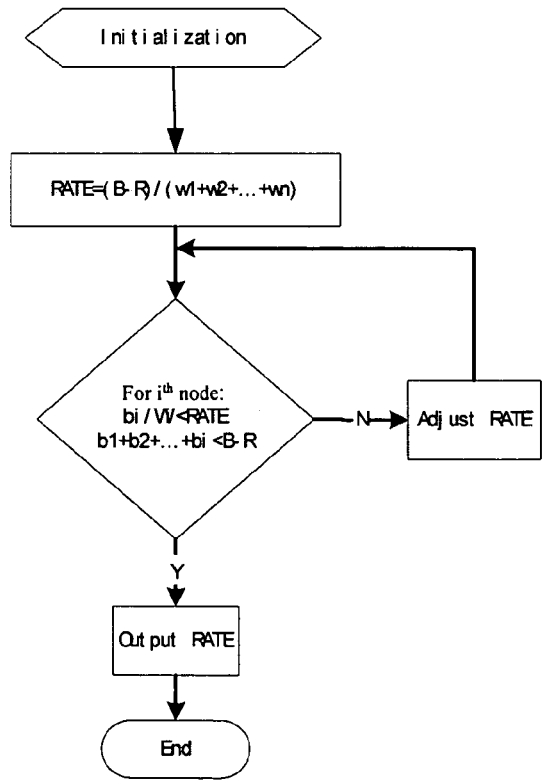
Figure 4A:
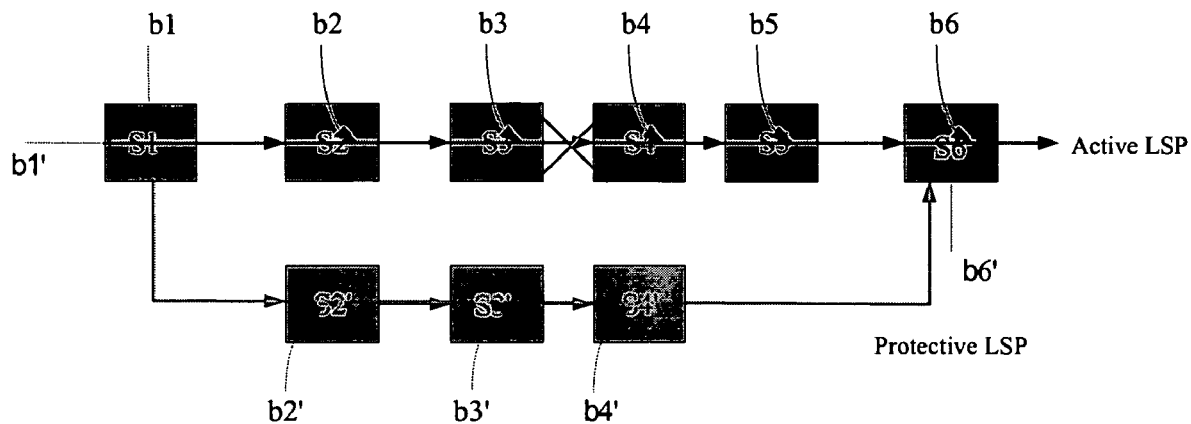
Figure 4B:
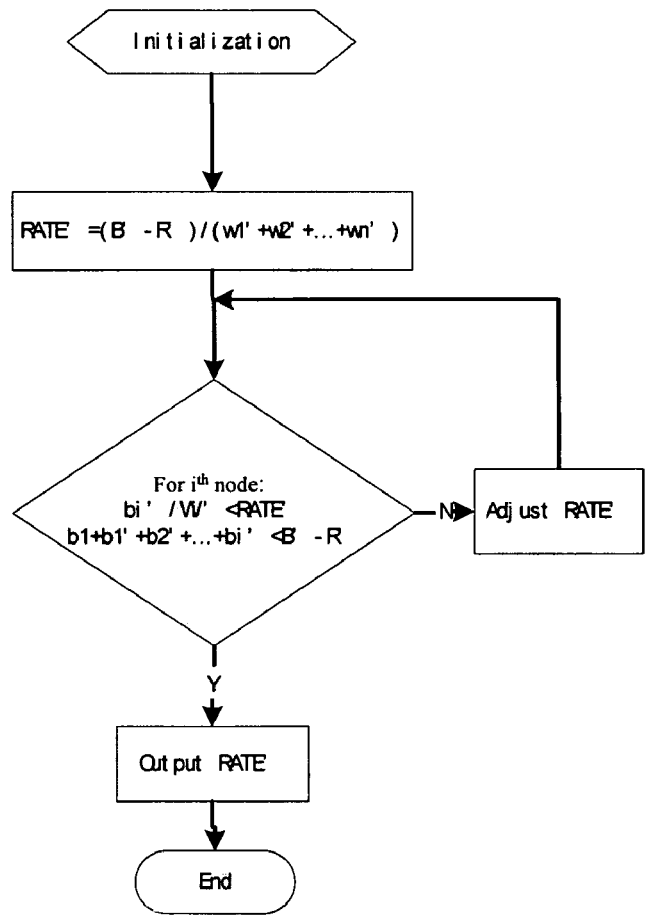

The calculation steps of the RATE that active LSP passes by are shown in FIG. 4b:

Upon initialized, assigning RATE=(B−R)/(W1+W2+ . . . +Wn);

For $i^{th}$ node, determining bi/Wi<RATE and b1+b2+ . . . +bi<B−R: if not, adjust RATE; if true, output RATE.

Upon RATE being derived, the accessing bandwidth of each node is RATE×Wi (weighing factor).

When protective switching-over occurs, the incoming rate of the active LSP source nodes is switched-over to the protective LSP. Through the fairness algorithm, the bandwidths are re-allotted, and RATE' of the protective channel is calculated with the accessed bandwidth of each node being RATE'×Wi' (weighing factor).

FIG. 4a' schematically shows the incoming rate of the nodes that the protective LSP passes by after the switching-over.

The calculation steps for RATE' of the nodes that the protective LSP passes by when in protective switching-over operation are shown in FIG. 4b':

bi' represents the accessing bandwidth of the node; Wi' represents the fairness factor allotted to the node; B' represents the total bandwidth; and R' represents the reserved bandwidth.

Upon initialized, assigning RATE'=(B'−R')/(W1'+W2'+ . . . +Wn');

For $i^{rth}$ node, determining bi'/Wi'<RATE' and b1'+b2'+ . . . +bi'<B'−R': if not, adjust RATE'; if true, output RATE'.

III. SDH processing module 3, adopted by channel LSP to packaging MPLS signals into SDH VC through extending GFP (general Frame procedure) and form, after the SDH crossing processing and payload processing, an STM-N optical signal that is transmitted in optic fiber.

This includes sequentially connected GPF packaging unit 31, SDH VC crossing and payload processing unit 32.

GPF packaging unit 31 packages the data transactions (tunnel LSP) with one or more double-layed MPLS tags into SDH VC(virtual channel) through GPF packaging unit 31, wherein GPF is defined by ITU-T G.7041 and has to be defined for its extension, but packaging for MPLS LSP signal has not been defined. The new fields are defined as: UPI (0000 0111), PTI (000) PFI (1), EXT(0001) and the identified GFP payload is MPLS frame.

The protocol layer for packaging the data transaction into SDH VC is Ethernet/MPLS/GFP/SDH VC.

SDH VC crossing and payload processing unit 32 exchanges the SDH VC according to the ITU-T G.707 specification and forms an STM-N signal after the processing of regenerating-field payload and multiplexing-field payload.

IV. Network managing system 4 performs the security, allotment, failure and performance managements for Ethernet transaction and SDH transmission.

Figure 5:
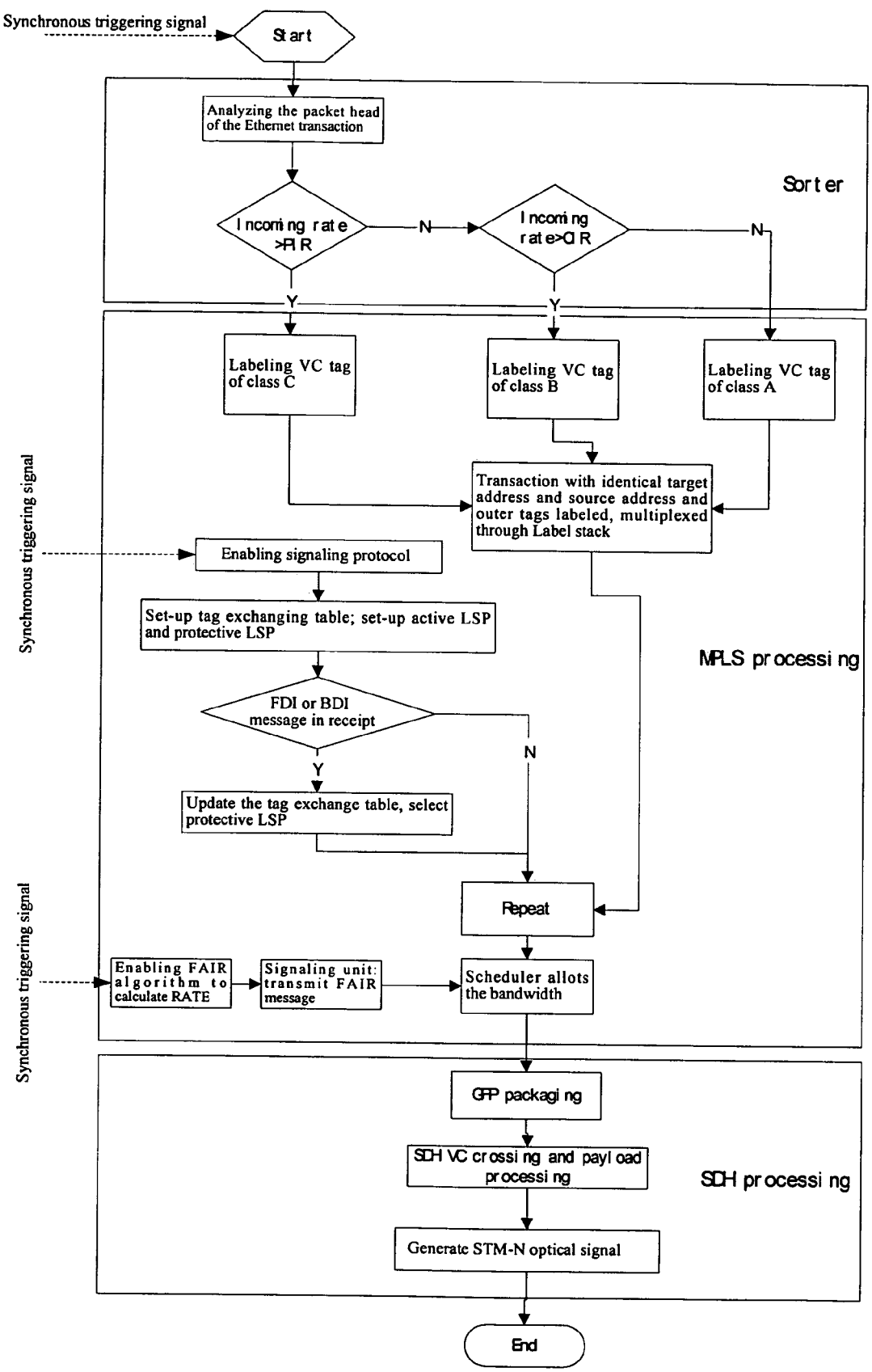
FIG. 5 is a flow chart for Ethernet transmission method having a quick protect and fairness attribute according to the present invention.

As shown in FIG. 5, the Ethernet transmission method with quick protection and fairness attribute of the present invention includes following steps:

1) the system analyzes the package head of the incoming Ethernet transaction to determine the incoming rate of the Ethernet transaction;

2) if incoming rate>PIR(peak incoming rate), VC-tag of class C is labeled; or otherwise determine whether the incoming rate>CIR(commitment information rate)? If true, VC-tag of class B is labeled; or otherwise, VC-tag of class A is labeled;

3) the aforesaid transactions of different bandwidths and with identical target address and source address are transacted to be labeled with outer MPLS tunnel tags and multiplexed through tag stack and afterwards tunnel LSP is formed; and 4) the system enables the signaling protocol and setup a tag exchanging table for identifying the active LSP and protective LSP to determine whether the receipt contains FDI message or BDI message: if true, the tag exchanging table is updated and protective LSP is selected; or otherwise, the tag is transferred;

5) calculate the RATE field value in the FAIR object of the Resv message based on the FAIR algorithm, produce a FAIR message and allot bandwidth to the transferred transaction;

6) package the data transaction with one or more double-layered MPLS tags into SDH VC through the GPF packaging unit and exchange SDH VC to form an STM-N signal after the processing of the regenerating field payload and multiplexing field payload.

In view of the above, the present invention has provided a solution for fairness and protection switching-over of the Ethernet and a simple method and apparatus with fairness attribute when in Ethernet transmission and quick protection through incorporating the SDH transmission technology and the Martini MPLS technology defined by PWE3 Faculty, defining three novel objects (FDI(forward defect indication), BDI(backward defect indication) and the Path and Resv message in the FAIR extended RSVP-TE signaling), and introducing a FAIR algorithm as well as LSP 1:1 protection.

We claim:

1. An Ethernet transmission apparatus having a quick protective and fair attribute, including a sorter for analyzing Ethernet frame heads and the Ethernet incoming rates for the incoming Ethernet transactions and then sorting the Ethernet transactions to output QoS Ethernet transactions; and a MPLS processing module, including sequentially connected VC-tag packaging unit, multiplexing unit, tag managing unit and a scheduler, wherein, the VC-tag packaging unit is connected with said sorter for packaging the Ethernet transactions of different QoS and labeling different tags to the Ethernet transactions of different QoS to form PW; the multiplexing unit multiplexing the PWs of identical starting points and destination in a way of a tag stack through adding outer MPLS tunnel tags, and forming tunnel LSP after the multiplexing; the tag managing unit including a repeater and a tag exchanging table, the repeater repeats the tags according to the information in the tag exchanging table which is used for identifying two labeled exchanging paths, i.e. an active LSP and a protective LSP; a scheduler schedules the incoming data to ensure the QoS of the transaction, characterized in that, first, said MPLS processing module further includes sequentially connected MPLS protecting unit, MPLS signaling unit and a fairness algorithm unit, wherein the MPLS signaling unit being used to set up the tag exchanging table identifying the active LSP and the protective LSP and controlling the operation of the repeater, extending RSVP-TE signaling, forwarding fairness message and protective message;

MPLS protecting unit being used to update the tag exchanging table when the active LSP being in error and to adopt a switching-over action to switch-over into the protective LSP;

the fairness algorithm unit being used to operate the fairness algorithm to indicate the allotted bandwidth of the scheduler;

second, said Ethernet transmission apparatus having a quick protective and fair attribute further includes an SDH processing module connected with said scheduler, said SDH processing module including a GFP packaging unit and a SDH VC crossing and payload processing unit, wherein the GPF packaging unit being used for packaging one or more data transactions with doubled layered MPLS tags into the SDH VC through the GFP packaging unit;

the SDH VC crossing and payload processing unit being used to exchange the SDH VC for forming a STM-N signal after the regenerating field and the multiplexing field processing, said sorter, MPLS processing module and the SDH processing module are respectively connected to a network managing system.

2. The Ethernet transmission apparatus having a quick protective and fair attribute according to claim 1, characterized in that, the scheduling way that the scheduler adopts is FIFO or weighed fairness scheduling or weighed pre-congestion detection.

3. The Ethernet transmission apparatus having a quick protective and fair attribute according to claim 1, characterized in that, said MPLS signaling unit extends the Path and Resv messages in RSVP-TE signaling through defining three novel objects: FAIR, FDI and BDI objects.

4. The Ethernet transmission apparatus having a quick protective and fair attribute according to claim 3, characterized in that, said fairness algorithm unit executes the fairness algorithm to calculate the RATE field value in the FAIR object to indicate the bandwidth allotted to the Ethernet transaction by the scheduler.

5. The Ethernet transmission apparatus having a quick protective and fair attribute according to claim 1, characterized in that, said GFP packaging module applies a new definition to the UPI field in the GFP frame for directly packaging the MPLS frame into SDH VC.

6. An Ethernet transmission method having a quick protective and fair attribute including steps of:

1) analyzing by a system the package head of the Ethernet transaction for the incoming Ethernet transaction for determining the incoming rate of the Ethernet transaction;

2) labeling a VC-tag of a first class if the incoming rate>a first set bandwidth value; or otherwise whether the incoming rate>a second set bandwidth value is further determined, if true, a VC-tag of second class is labeled, or otherwise the incoming rate>a third set bandwidth value is further determined, if true, a VC-tag of third class is labeled; in such a iterative way the greatness between the incoming rate and the n-th set bandwidth value is determined up to a VC-tag of n-th class is labeled to the incoming rate and thus Ethernet transactions with N different bandwidths are obtained, wherein, N is a natural number;

3) transactions with N different bandwidths are transacted for identical target address and identical source address and labeled with outer MPLS tunnel tags, and multiplexed through way of tag stacks to form a tunnel LSP after the multiplexing; and 4) the system enables a signaling protocol to set-up a tag exchange table identifying the active LSP and protective LSP to determined whether a receipt contains an FDI message or a BDI message; if true, the tag exchange table is updated and the protective LSP is selected; or otherwise, the tag is transferred;

5) calculating the RATE field value in the FAIR object of the Resv message according to the fairness algorithm, producing a fairness message and allotting bandwidths to the transferred transactions;

6) packaging one or more data transactions with double layered MPLS tags into SDH VC through the GPF packaging unit, and exchanging the SDH VC and forming a STM-N signal after the processing of the regenerated field payload and multiplexed field payload.

7. The Ethernet transmission method having a quick protective and fair attribute according to claim 6, characterized in that, the active LSP and protective LSP in step 4) independently transmit data, when a protection occurs, the transaction in the active channel is switched-over to the protective channel, the nodes on the protective LSPs are controlled by the fairness algorithm and bandwidths are re-allotted.

8. The Ethernet transmission method having a quick protective and fair attribute according to claim 6, characterized in that, the procedure for said fairness algorithm unit that undertakes the RAKE calculation for the nodes that active LSP passes by is: setting bi to represent the bandwidth a node accesses, Wi to represent a fairness factor allotted to the node, B to represent the entire bandwidth, R to represent a reserved bandwidth; when the system initialized, assigning RATE=(B−R)/(W1+W2+ . . . +Wn); for ith node, determining bi/Wi<RATE and b1+b2+ . . . +bi<B−R; if false, adjusting RATE; if true, outputting RATE, when RATE being derived, the bandwidth for each accessing node is RATE×Wi;

when protection occurs, the calculation procedure for RATE' of the nodes that a protective LSP passes by is:

setting bi' to represent the bandwidth a node accesses, Wi' to represent a Fairness factor allotted to the node, B' to represent the entire bandwidth, R' to represent a reserved bandwidth; when the system initialized, assigning RATE'=(B'−R')/(W1'+W2'+ . . . +Wn'); for i'th node, determining bi'/Wi'<RATE' and b1+b1'b2'+ . . . +bi'<B'−R'; if false, adjusting RATE'; if true, outputting RATE', when RATE' is derived, the bandwidth for each accessing node is RATE'×Wi'.

* * * * *